United States Patent
Düser et al.

(10) Patent No.: US 11,897,494 B2
(45) Date of Patent: Feb. 13, 2024

(54) METHOD AND A DEVICE FOR GENERATING A DYNAMIC SPEED PROFILE OF A MOTOR VEHICLE

(71) Applicant: AVL LIST GMBH, Graz (AT)

(72) Inventors: Tobias Düser, Bensheim (DE); Sascha Bauer, Hemsbach (DE)

(73) Assignee: AVL List GmbH, Graz (AT)

(*) Notice: Subject to any disclaimer, the term of this patent is extended or adjusted under 35 U.S.C. 154(b) by 214 days.

(21) Appl. No.: 16/650,926

(22) PCT Filed: Sep. 26, 2018

(86) PCT No.: PCT/AT2018/060225
§ 371 (c)(1),
(2) Date: Jul. 17, 2020

(87) PCT Pub. No.: WO2019/060938
PCT Pub. Date: Apr. 4, 2019

(65) Prior Publication Data
US 2020/0346659 A1  Nov. 5, 2020

(30) Foreign Application Priority Data

Sep. 26, 2017  (AT) ............................. A 50822/2017

(51) Int. Cl.
*B60W 50/14* (2020.01)
*G01C 21/34* (2006.01)

(52) U.S. Cl.
CPC ......... *B60W 50/14* (2013.01); *G01C 21/3407* (2013.01)

(58) Field of Classification Search
CPC .. G05D 2201/0213; G05D 2201/0212; B60W 50/14; B60W 2510/0666;
(Continued)

(56) References Cited

U.S. PATENT DOCUMENTS

2004/0049339 A1* 3/2004 Kober ................ G01C 21/3492
701/533
2007/0083314 A1* 4/2007 Corigliano ............... G01C 9/00
701/80
(Continued)

FOREIGN PATENT DOCUMENTS

AT      510101 A2 *  1/2012  ........... G09B 29/003
CN     101516712        8/2009
(Continued)

OTHER PUBLICATIONS

JP2000111571A_Description_20220412_1732.pdf (Year: 2022).*
(Continued)

*Primary Examiner* — Thomas Ingram
*Assistant Examiner* — Faris Asim Shaikh
(74) *Attorney, Agent, or Firm* — Sheridan Ross P.C.

(57) ABSTRACT

The invention relates to a method for generating a dynamic speed profile of a motor vehicle which is suitable for simulating in particular actual vehicle operation on a route, comprising the following procedural steps: determining a route-based static speed profile for the route resolved into route segments based on information from a digital map; determining a route-based dynamized speed profile on the basis of the route-based static speed profile which factors in a defined maximum target deceleration to reach mandatory speed minima of the speed profile; determining a time-based dynamic speed profile resolved into time increments on the basis of the route-based dynamized speed profile, wherein an applied acceleration is determined in each time increment based on the speed dictated by the speed profile in a route segment corresponding to the respective time increment and the applied speed in the time increment; and outputting the time-based dynamic speed profile.

30 Claims, 4 Drawing Sheets

(58) Field of Classification Search
CPC ... B60W 2510/1005; B60W 2540/043; B60W 2552/30; B60W 2720/103; B60W 2720/106; B60W 30/143; B60W 30/18072; B60W 50/0097; B60W 40/08; B60W 40/105; B60W 40/109; B60W 2520/10; B60W 2520/125; B60W 2710/0644; B60W 60/00272; B60Y 2300/143; B60Y 2300/18066; G01C 21/3407; G01M 17/007; G08G 1/052

See application file for complete search history.

(56) References Cited

U.S. PATENT DOCUMENTS

| | | | |
|---|---|---|---|
| 2007/0150157 A1* | 6/2007 | Lee | B60K 31/0083 701/93 |
| 2007/0222638 A1* | 9/2007 | Chen | G08G 1/096 340/901 |
| 2011/0205045 A1* | 8/2011 | Pilutti | G08G 1/167 701/31.4 |
| 2012/0242513 A1 | 9/2012 | Oguchi et al. | |
| 2014/0277835 A1* | 9/2014 | Filev | G06F 17/00 701/2 |
| 2015/0268053 A1* | 9/2015 | Yu | B60L 15/2045 701/22 |
| 2015/0298689 A1* | 10/2015 | Schwartz | B60W 10/24 903/904 |
| 2016/0171133 A1 | 6/2016 | Pfister et al. | |
| 2016/0264136 A1* | 9/2016 | Minoiu Enache | B60W 30/095 |
| 2017/0050644 A1* | 2/2017 | List | B60W 40/12 |
| 2017/0243073 A1* | 8/2017 | Raghu | G06V 20/582 |
| 2017/0247028 A1* | 8/2017 | Goudy | B60W 30/095 |
| 2018/0222477 A1* | 8/2018 | Wang | B60W 30/143 |
| 2018/0281784 A1* | 10/2018 | Huang | B60W 30/095 |
| 2018/0330616 A1* | 11/2018 | Casson | G01C 21/28 |
| 2019/0072960 A1* | 3/2019 | Lin | G05D 1/0088 |
| 2019/0079528 A1* | 3/2019 | Zhu | G05D 1/0238 |

FOREIGN PATENT DOCUMENTS

| | | | | |
|---|---|---|---|---|
| CN | 104620025 | | 5/2015 | |
| DE | 102007007730 | | 8/2008 | |
| DE | 102012018359 | | 3/2013 | |
| DE | 102012018359 A1 * | 3/2013 | | G09B 29/003 |
| DE | 102014002111 A1 * | 8/2015 | | B60W 10/02 |
| DE | 102014005398 A1 * | 10/2015 | | F16H 59/48 |
| DE | 102017107271 | | 7/2017 | |
| EP | 0200660 A1 * | 11/1986 | | B60W 30/143 |
| EP | 1672348 | | 6/2006 | |
| EP | 2246636 | | 11/2010 | |
| GB | 2342174 | | 4/2000 | |
| JP | H10-213524 | | 8/1998 | |
| JP | 2000111571 A * | 4/2000 | | G01D 3/08 |
| JP | 2011-112601 | | 6/2011 | |
| JP | 2012-003352 | | 1/2012 | |
| JP | 2012144160 A * | 8/2012 | | |
| JP | 2017-522213 | | 8/2017 | |
| KR | 20150137902 A * | 9/2015 | | B60W 40/04 |
| WO | WO-2016136874 A1 * | 9/2016 | | B60T 8/17 |

OTHER PUBLICATIONS

DE102014002111A1_Translation.pdf (Year: 2022).*
DE102012018359A1_Translation.pdf (Year: 2022).*
WO2016136874__VEHICLE_CONTROL_DEVICE_FO . . . _COASTING_TRAVEL_OF_VEHICLE__002_.pdf (Year: 2022).*
Translation of AT510101A2 from Espacenet retrieved on Sep. 26, 2022 (Year: 2022).*
Translation of KR-20150137902-A from Espacenet retrieved on Mar. 2, 2023 (Year: 2023).*
Translation of EP 0200660 A1 from Espacenet retrieved on Mar. 2, 2023 (Year: 2023).*
Translation of DE-102014005398-A1 from Espacenet retrieved on Mar. 8, 2023 (Year: 2023).*
Translation of JP-2012144160-A from Espacenet retrieved on Mar. 8, 2023 (Year: 2023).*
English Translation of International Search Report for International (PCT) Patent Application No. PCT/AT2018/060225, dated Jan. 7, 2019, 2 pages.
International Search Report and Written Opinion for International (PCT) Patent Application No. PCT/AT2018/060225, dated Jan. 7, 2019, 17 pages.
Wolf "Map-Based Driving Cycle Generation," Karlsruher Institut fur Technologie, 2015, Diploma Thesis, 120 pages.
Official Action for Austria Patent Application No. A 50822/2017, dated Jun. 27, 2018, 4 pages.
Official Action for Austria Patent Application No. A 50822/2017, dated Sep. 18, 2018, 2 pages.
Official Action for Austria Patent Application No. A 50822/2017, dated Nov. 7, 2018, 2 pages.
Official Action for Japan Patent Application No. 2020-517423, dated Aug. 29, 2022, 10 pages.
Official Action with English Translation for Japan Patent Application No. 2020-517423, dated Feb. 20, 2023, 12 pages.
Official Action with English Translation for China Patent Application No. 201880076154.5, dated Jan. 10, 2023, 20 pages.

* cited by examiner

METHOD AND A DEVICE FOR GENERATING A DYNAMIC SPEED PROFILE OF A MOTOR VEHICLE

CROSS REFERENCE TO RELATED APPLICATIONS

This application is a national stage application under 35 U.S.C. 371 and claims the benefit of PCT Application No. PCT/AT2018/060225 having an international filing date of 26 Sep. 2018, which designated the United States, which PCT application claimed the benefit of Austria Patent Application No. A50822/2017 filed 26 Sep. 2017, the disclosures of each of which are incorporated herein by reference in their entireties.

FIELD OF THE INVENTION

The invention relates to a method and an apparatus for generating a dynamic speed profile of a motor vehicle which is suitable for simulating in particular actual vehicle operation on a route.

BACKGROUND

The Real-Driving Emissions (RDE) legislation was introduced to reduce the discrepancy between homologation and real-world motor vehicle emissions. In doing so, in addition to a test cycle in the laboratory (WLTP, WLTC), motor vehicles must as of September 2017 also demonstrate compliance with on-road emission limits under real driving conditions for type-approval testing in the European Union.

Thus, more than ever before, development is focusing on pollutant emissions in real-world driving operations. The ultimate goal is not the observance of emission limits within a precisely predefined cycle under predefined limiting conditions as before but rather robustly meeting emission targets during actual test drives on unfamiliar roadways with intentionally broadly defined limiting conditions.

Consequently, the RDE legislation has a major impact on the development of new automotive drives. The road as a test environment makes for great technical challenges. In conventional cycle-based development, road trials under real conditions are not possible until prototype vehicles are available and thus at the end of the development process. A typical RDE test program with portable emission measuring devices (Portable Emission Measurement System, PEMS) thereby consists of a large number of test drives on different roadways with different drivers so as to statistically cover the widest possible range of conditions. Should fundamental problems be diagnosed at this stage of development, troubleshooting is usually only possible at high cost and entails great effort.

Although with its multitude of factors, having the road as a test environment provides the necessary stochastic basis to ensure that motor vehicles also meet the required emission targets in customer operation, it is virtually impossible to perform two measurements under comparable conditions in real-world on-road test drives due to said hard-to-control factors. For this reason, the effects of modifying drives or motor vehicles do not allow for specific comparison to a baseline condition. This makes it difficult to draw conclusions as to the effectiveness of modifications. The road is thus only conditionally suitable as a development environment.

Test bench tests, on the other hand, are reproducible and influences or parameters can be deliberately kept constant as needed. The effects of influences and their modifications are thereby transparent. Moreover, test bench testing can be performed with more complex measurement technology, leading to more meaningful test results. However, test cycles run on a test bench lead to the above-described known discrepancies between motor vehicle homologation and the emission values obtained later in real-world road traffic.

Document EP 1 672 348 A1 relates to a method for operating a motor vehicle on a roller test stand, wherein the motor vehicle is equipped with a motor control unit via which an electronically controlled allocation of fresh air or a fresh air mixture respectively and an automatic transmission or an electronically operated transmission can be controlled.

In addition, further test benches for testing a motor vehicle or components of a motor vehicle are known from the prior art, for example powertrain test benches, transmission test benches, etc.

It is furthermore possible to run partial or full model-based testing of a motor vehicle or components of the motor vehicle. To that end, a model is created of the motor vehicle to be tested or the component or components to be tested and the driving operation then subsequently simulated on the basis of these models and a test cycle.

A test cycle, also called driving cycle, establishes under which conditions at which speed profile; i.e. a chronological sequence of speed, a motor vehicle is operated.

SUMMARY OF THE INVENTION

One task of the invention is that of enabling improved testing of motor vehicles or their components. In particular a task of the invention is providing a speed profile for improved applicable testing under the terms of the RDE legislation.

The task is solved by a method according to claim 1, a computer program according to claim 28, a machine-readable medium, and an apparatus according to claim 29. Advantageous embodiments are set forth in the subclaims. The teaching of the claims is expressly made a part of the description.

A first aspect of the invention relates to a method for generating a dynamic speed profile of a motor vehicle which is suitable for simulating in particular actual vehicle operation on a route and/or is suitable for setting target speeds for driver assistance systems, particularly for predictive driving functions, preferably having the following steps:

- determining a route-based static speed profile for the route, in particular resolved into route segments, based on information from a digital map;
- determining a route-based dynamized speed profile on the basis of the route-based static speed profile which factors in a defined maximum target deceleration to reach mandatory speed minima of the speed profile;
- determining a time-based dynamic speed profile, in particular resolved into time increments, on the basis of the route-based dynamized speed profile, whereby an applied acceleration is determined in each time increment based on the speed dictated by the speed profile in a route segment corresponding to the respective time increment and the applied speed in the time increment; and
- outputting the time-based dynamic speed profile.

Preferably, the method according to the invention runs fully automatically; i.e. without user intervention. The steps of determining the static speed profile and determining the dynamized speed profile can preferably also be realized in a single procedural step.

A second and third aspect of the invention relate to a corresponding computer program and a machine-readable medium.

A fourth aspect of the invention relates to an apparatus for generating a dynamic speed profile of a motor vehicle which is suitable for simulating in particular actual vehicle operation on a route and/or is suitable for setting target speeds for driver assistance systems, particularly for predictive driving functions, preferably comprising:

- means for determining a route-based statistical speed profile for the route resolved into route segments based on information from a digital map;
- means for determining a route-based dynamic speed profile on the basis of the route-based statistical speed profile which factors in a defined maximum target deceleration to reach, in particular mandatory, speed minima of the route-based static speed profile;
- means for determining a time-based dynamic speed profile, resolved into time increments, on the basis of the route-based dynamic speed profile, whereby an applied acceleration is determined in each time increment based on the speed dictated by the speed profile in a route segment corresponding to the respective time increment and the applied speed in the time increment; and
- an interface for outputting the time-based dynamic speed profile.

A route in the sense of the invention is a roadway traveled or to be traveled.

A route-based speed profile in the sense of the invention indicates the speed as a function of a distance traveled.

A static speed profile in the sense of the invention is the designation of an interim result of the inventive method. In particular, the static speed profile does not factor in any acceleration or braking deceleration.

A dynamized speed profile in the sense of the invention is a further interim result or interim product respectively of the inventive method. The dynamized speed profile preferably does not factor in any positive accelerations.

A time-based speed profile in the sense of the invention shows the speed on a route as a function of time, in particular a respective elapsed time since the start of the route.

A digital map in the sense of the invention is a collection of data associated with geodata, wherein the data at least comprises information on any legally mandated speed limits relative to the geodata. A digital map can in particular be a database. Preferably, a digital map comprises further information relative to roads.

A simulation in the sense of the invention can be performed on a test bench or realized in purely model-based manner on a computer. Preferably, at least one component can also be operated in simulated mode on a test bench and at least one other component can be operated on a computer based on a model during a simulation.

Output in the sense of the invention means in particular the providing of data. Preferably, this can take place at a data interface and/or also at a user interface.

A means in the sense of the invention can be designed as hardware and/or software and particularly comprises a processing unit, in particular digital, particularly a microprocessor unit (CPU), preferably data/signal-connected to a memory and/or bus system, and/or one or more programs or program modules. The CPU can thereby be configured to process commands implemented as a program stored in a memory system, record input signals from a data bus and/or provide output signals to a data bus. A memory system can comprise one or more, in particular different, storage media, in particular optical, magnetic, solid-state and/or other non-volatile media. The program may be such that it embodies or is respectively capable of executing the methods described herein such that the CPU can execute the steps of such methods and thus in particular can determine a target variable value relative to the robustness of at least one vehicle of a vehicle type.

The invention is in particular based on the approach of being able to analyze driving scenarios which are as realistic as possible as early in the development process of a motor vehicle as possible so as to obtain reliable results for a later real-world driving operation of the real motor vehicle. According to the invention, this is achieved by generating a speed profile based on an actual route.

This route can be determined in a digital map on the basis of a route previously traveled by a motor vehicle or can also be established by a user using a digital map.

A raw data set determined in this way, called the route-based static speed profile according to the invention, is processed in further steps in such as way as to restrict different limiting conditions or parameters relating to the motor vehicle, the respective driver and/or other occupants, the road conditions of the route, the respective weather conditions etc.

One raw data processing phase allows for a maximum target deceleration. Furthermore, an applied acceleration is calculated and factored into the speed profile for acceleration phases. Both the maximum target deceleration as well as the applied acceleration thereby preferably depend on the respective type of driver.

The result of the inventive method is a speed profile which realistically represents the movement of the motor vehicle on a real-world route or an artificial route replicated as realistically as possible. This speed profile can serve as the basis for a test cycle used on a test bench or even in a purely model-based test of the motor vehicle and/or its components.

By means of this speed profile, referred to as a time-based dynamic speed profile according to the invention, the conformity of individual components or of the entire motor vehicle can be tested early on during various developmental stages of a motor vehicle's development process. A variety of real-world influences can thereby be reproducibly depicted and stochastic test conditions nevertheless rendered possible by the parameterizing of these influences. This can be of advantage particularly when testing for RDE compliance.

This is not efficiently possible when testing in real-world road traffic due to a lack of reproducibility and the high costs as well as the late point in time or respectively development stage of the development process already present by then. The load spectrum of testing in real-world road traffic is in particular not known in advance and, except for a few fixed limiting conditions, is random. In particular, factors such as traffic, weather, etc., make reproducibility of tests in real-world road traffic virtually impossible.

The inventive method enables test bench or model-based test operation which at least substantially corresponds to operation in real-world road traffic. Thus, discrepancies between test operation and later real-world customer operation are on the one hand at least reduced. Furthermore, a range of development tasks can be shifted to an earlier point in time or an earlier stage of development in the development process respectively. This is of great advantage, particularly due to the continuing cost pressure and greater product variety in the automotive industry. The inventive method can considerably shorten the duration of real-world tests and thus ensure a time and cost-saving development process.

In one advantageous embodiment of the method, after one traffic signal, further traffic signals in a defined area, preferably from about 100 m to 20 m, more preferably from about 80 m to 40 m and most preferably from about 60 m, are not taken into account when determining the speed profile for the route-based static speed profile. Doing so can preferably prevent the method from misinterpreting traffic signals in the opposite direction to the direction of travel as being stopping points.

In a further advantageous embodiment of the inventive method, a maximum speed for the route-based static speed profile is driver-specific. Different types of drivers, or their behavior respectively, can thereby be taken into account.

In a further advantageous embodiment of the inventive method, the reference amount of an acceleration value in one time increment to an acceleration value in a preceding time increment is less than a threshold value, whereby the threshold is determined as a function of the driving physics, the vehicle and/or the driver. As a result, jerks in the longitudinal movement of a vehicle, which would not be tolerable, can be excluded from the speed profile.

In a further advantageous embodiment of the inventive method, upon the occurrence of speed jumps in the static speed profile, ensuing from a mandatory speed minimum, the applied speed in the preceding route segments is determined for the dynamized speed profile based on the respective speed applied in the following segment and a defined standard target deceleration, in particular a maximum target deceleration, until the speed applied in one of the preceding route segments reaches the value of the speed profile in said route segment.

A speed jump within the meaning of the invention is when a change in speed within a defined distance is greater than a predetermined threshold value. This threshold is preferably as high as would be if the change in speed were caused by the maximum target deceleration. Alternatively or additionally, there is a jump in speed when the progression of the static speed profile is not continuously differentiable.

A maximum target deceleration in the sense of the invention is preferably dictated by the properties of the motor vehicle and/or the ambient conditions of the motor vehicle and/or the type of driver.

Due to the structuring of the raw data originating from a digital map, the speeds of the static speed profile correspond to the respective maximum speed values granted by a driver or by a legal speed limit. These speed values can change abruptly from one route segment to the next route segment. This is of course unrealistic. The aim of this advantageous embodiment is therefore to identify the actual braking points at which the driver begins to brake in order to reach the speed minimum to be met in a certain route segment. In particular, starting from the minimum speed to be reached, it is inventively determined what the speed value had to have been for each previous route segment, factoring in a standard target deceleration, until the value of the static speed profile is finally reached. From the jump in speed in the static speed profile, a steady progression of the speed in the dynamized speed profile thereby results. Preferably also able to thereby be taken into account is a slope and/or the loading of the motor vehicle in the relevant route segments.

In one advantageous embodiment of the inventive method, the method further comprises the following procedural step:

determining a coasting speed profile which factors in a target deceleration defined by the coasting behavior of the vehicle in order to reach, in particular mandatory, speed minima of the static speed profile.

In the context of the invention, the target deceleration defined by the vehicle's coasting behavior is the target deceleration induced by the driving style resistances of the motor vehicle itself and driving resistances of the motor vehicle with its environment. These can be considered both in the engaged state as well as in the disengaged state of the motor vehicle.

Accordingly, in one advantageous embodiment, the apparatus according to the invention comprises means for determining a coasting speed profile which factors in a target deceleration defined by the coasting behavior of the vehicle in order to reach, in particular mandatory, speed minima of the static speed profile.

In a further advantageous embodiment of the inventive method, upon the occurrence of speed jumps in the static speed profile, ensuing from an, in particular mandatory, speed minima, the applied speeds in the preceding route segments are determined for the static speed profile based on the respective speed applied in the following route segment and the target deceleration defined by the coasting behavior until the speed applied in one of the preceding route segments reaches the value of the static speed profile in said route segment. As described in relation to the maximum target deceleration, the coasting behavior of the motor vehicle is factored in here as well when determining a progression of the speed profile starting from a speed minima of the static speed profile. Preferably also able to thereby be taken into account is a slope and/or the loading of the motor vehicle in the relevant route segments.

In a further advantageous embodiment, a progression of the route-dependent dynamized speed profile is determined on a driver-specific basis between the progression determined by means of the standard target deceleration and the progression determined by means of the coasting behavior. Depending on driver type, a predictive driving style can thereby be taken into account.

In a further advantageous embodiment of the inventive method, the acceleration for the dynamic speed profile in one time increment is set to a defined acceleration value, in particular less than or equal to a maximum target acceleration, or a defined deceleration value, in particular greater than or equal to a defined standard target deceleration, when the applied speed is lower or higher than the value of the dynamized speed profile at the route segment corresponding to said time increment. It can thereby be ensured that the dynamic speed profile of the default approximates the dynamized speed profile prior to it ultimately being reached.

In a further advantageous embodiment of the inventive method, the defined acceleration value depends on the performance characteristics of the motor vehicle. Therefore, the respective operating point of the motor vehicle's drive is preferably defined and determines the feasibly available power.

In a further advantageous embodiment of the inventive method, the defined acceleration value is reduced to an equalizing acceleration dependent on the applied speed in the respective time increment within a tolerance range around the dynamized speed profile. This thereby takes into account that even before reaching a target speed, drivers generally slowly decrease acceleration.

In a further advantageous embodiment of the inventive method, the maximum target acceleration is driver-specific. Preferably taken into account for the maximum target acceleration is a slope and/or a loading of the motor vehicle and/or a driver's sensation of acceleration on the slope.

In a further advantageous embodiment, a shifting logic of the vehicle is taken into account for the time-based dynamic speed profile which provides for an upshifting upon the engine reaching a maximum rotational speed and a downshifting at a minimum engine rotational speed, whereby in the case of a manual transmission vehicle, a defined shift delay, preferably one second, is further factored in. The time-based dynamic speed profile can thereby be made even more realistic.

In a further advantageous embodiment of the inventive method, the speed profile is determined on the basis of the target deceleration defined by the vehicle's coasting behavior during the shift delay. The coasting behavior can thereby be taken into account both in the engaged as well as in the disengaged state.

In a further advantageous embodiment, the inventive method moreover comprises the following procedural step: checking whether there is a jump in speed in the static and/or dynamized speed profile in a first upcoming route section representing a first predefined time period in relation to a respective time increment, whereby upon a speed jump being ascertained, a target deceleration defined by the coasting behavior of the vehicle is selected as the defined deceleration value, and whereby upon the applied speed in a time increment and/or the corresponding route segment reaching the value of the static or dynamized speed profile, the defined standard target deceleration is selected as the defined deceleration value.

A route section within the meaning of the invention thereby contains one or more route segments.

This measure as well can make the dynamic speed profile more realistic. The inventors have namely found that a driver will initially allow a vehicle to coast slightly before initiating a braking operation.

Accordingly, in one advantageous embodiment, the inventive apparatus comprises means for checking whether there is a speed jump in the static and/or dynamized speed profile in a first upcoming route section, which represents a first predefined period of time in relation to a respective time increment, whereby upon a jump in speed being determined, a target deceleration defined by the coasting behavior of the motor vehicle is selected as the defined deceleration value, and whereby upon the applied speed in a time increment and/or the corresponding route segment reaching the static or dynamic speed profile value, a defined standard target deceleration is selected as the defined deceleration value.

In a further advantageous embodiment, the inventive method moreover comprises the following procedural step: checking whether there is a speed jump in the static and/or dynamized speed profile in a second upcoming route section, which represents a second predefined period of time in relation to a respective time increment, whereby upon a jump in speed being determined, "zero" is selected as the defined deceleration value, and whereby the second predefined time period is preferably prior to the first predefined time period.

Accordingly, the inventive apparatus comprises means for checking whether there is a speed jump in the static and/or dynamized speed profile in an upcoming second predefined time period in relation to a respective time increment, whereby upon a jump in speed being determined, "zero" is selected as the predefined deceleration value, and wherein the second predefined time period is preferably prior to the first predefined time period.

This measure as well serves to make the dynamic speed profile even more realistic. In particular replicated is the human behavior observed by the inventors of not directly switching from accelerating to coasting but rather keeping a constant speed beforehand.

Preferably, the second predefined period of time is just as long as the first predefined period of time.

In a further advantageous embodiment of the inventive method, data points are read in from the digital map for the route-based static speed profile and/or generated on the basis of the information from the digital map.

In a further advantageous embodiment of the inventive method, each curve is assigned a maximum cornering speed for the route-based static speed profile on the basis of at least one parameter from the following group:
respective curve radius;
respective curvature;
a driver-specific parameter; and/or
a maximum lateral acceleration.

Preferably, curves having a radius greater than about 600 m are not treated as curves. Preferably, a minimum cornering speed of 20 km/h is also dictated when the curve radius falls short of a defined value, preferably approximately 15 m.

In a further advantageous embodiment of the inventive method, a distance between the map points is established to determine the curve radius of the route-based static speed profile as a function of the angle between a straight line through a first and a second map point read from the digital map and another straight line through the second and a third map point read from the digital map, wherein generated map points with a smaller distance, preferentially about 3 m, more preferentially about 2 m, most preferentially approximately 1 m, are used for angles less than about 45°, preferentially about 40°, most preferentially approximately 30°, and map points with a larger distance, in particular the distance of the raw map data points read from the digital map, are used for larger angles.

The inventors have determined that such a selection of map points can realistically replicate an actual route a motor vehicle takes through any given curve. Preferably, circle equation is used to calculate the curve radius.

In a further advantageous embodiment of the inventive method, the selected map points are linked to a trajectory of the motor vehicle, in particular by interpolation.

In a further advantageous embodiment of the inventive method, a maximum cornering speed is calculated for the route-based speed profile on the basis of the curve radius. Preferably, human behavior when cornering is thereby taken into account, in particular on a driver-specific basis. Further preferably, a maximum lateral acceleration is first calculated as an intermediate step. Preferably, it is thereby taken into account that people accept higher lateral forces at low speeds than at high speeds.

In a further advantageous embodiment of the inventive method, the dynamic speed profile is output as a time-based dynamic speed profile. In this case, the speed profile generated is particularly well suited to simulating an, in particular real, driving operation on a route, as the dynamic speed profile can be run particularly well as a chronological progression with the corresponding control variables of a test bench.

In a further advantageous embodiment of the inventive method, a route-based dynamic speed profile resolved into route segments, which is output, is determined on the basis of the dynamic speed profile resolved into time increments. In this case, the speed profile generated is particularly well suited to specifying target speeds for driver assistance systems, in particular for predictive driving functions, since each route segment can be allocated a target speed.

A fifth aspect of the invention relates to a method for analyzing at least one component of a motor vehicle, wherein the at least one component or the motor vehicle is subjected to a real or simulated test operation on the basis of a time-based dynamic speed profile, wherein the time-based dynamic speed profile, based on a route-based, in particular dynamized, speed profile resolved into route segments, is determined by resolving it into time increments, wherein an applied acceleration is determined in each time increment on the basis of the speed dictated by the route-based speed profile in a route segment corresponding to the respective time increment and the applied speed in the time increment.

In one advantageous embodiment of the inventive method, the route-based, in particular dynamized, speed profile is determined starting from a route-based static speed profile, wherein a defined, in particular maximum, target deceleration for achieving, in particular mandatory, speed minima of the route-based static speed profile is factored in.

In a further advantageous embodiment of the inventive method, the route-based static speed profile for the route is determined on the basis of information from a digital map.

In a further advantageous embodiment of the inventive method, the dynamic speed profile and/or the route-based speed profile, in particular the applied acceleration, and/or the route-based static speed profile, in particular the defined target deceleration, depend(s) on one or more parameters.

In a further advantageous embodiment of the inventive method, one or more parameters are varied in order to analyze the at least one component or the motor vehicle.

A sixth aspect of the invention relates to a method for guiding a motor vehicle by means of a driver assistance system, in particular for predictive driving functions, wherein target speeds for guiding the motor vehicle are determined in a dynamic speed profile, wherein the dynamic speed profile is determined starting from a route-based, in particular dynamized, speed profile by resolving it into time increments, wherein an applied acceleration is determined in each time increment on the basis of the speed dictated by the route-based speed profile in a route segment corresponding to the respective time increment and the applied speed in the time increment.

The inventive methods are in particular computer-aided or in particular realized with computer assistance.

Features and advantages with respect to the first aspect of the invention apply mutatis mutandis to the further aspects of the invention and vice versa.

BRIEF DESCRIPTION OF THE DRAWINGS

The following will describe further features and advantages of the invention by means of exemplary embodiments relating to the figures. Shown are.

DETAILED DESCRIPTION

Figure 1:
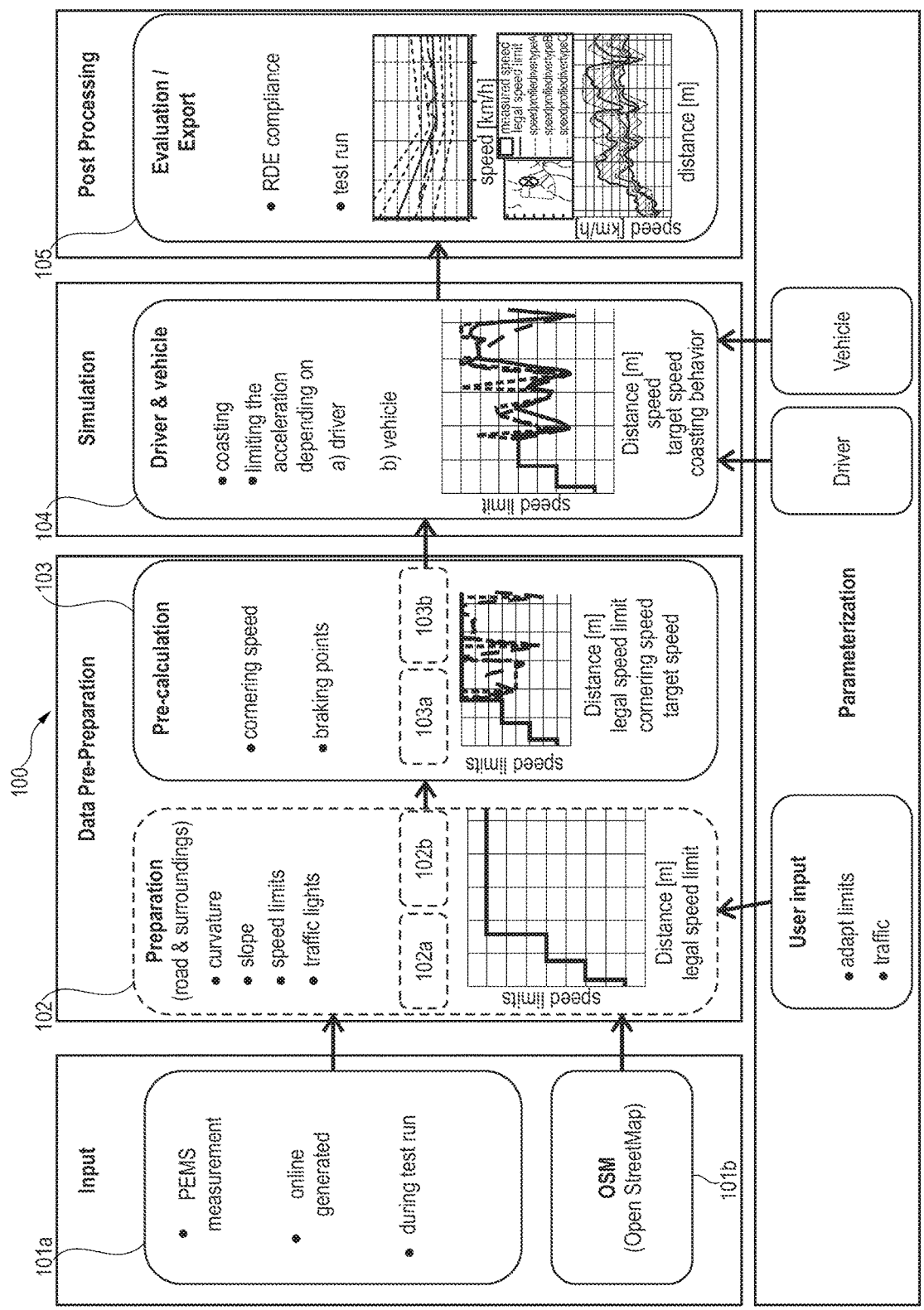
FIG. 1 a flow chart of an exemplary embodiment of the inventive method according to the first aspect of the invention.

FIG. 1 shows a flow chart of a method according to the first aspect of the invention.

In one procedural step 101a, 101b of data acquisition, the input; i.e. the raw data, is generated for the subsequent procedural steps. To that end, geodata of a specific route R is preferably required. Real-world measurements from a test run on the road can thereby serve as the source of the geodata of route R 101a. Alternatively or additionally, however, it is also possible to generate geodata on the computer on the basis of online maps 101b. Advantageously, the creating of a route R can thereby be generated in a user-friendly manner by means of a computer-based route planner with a digital map. Further preferably, this can ensue by specifying fewer route points along a desired route R. Corresponding functionalities are known from various route planners at the time of application, for example from Google Maps®. OpenStreetMaps (OSM) can for example be used as a digital map. Other maps from other providers are however also applicable.

After the creation of the route R and/or the importing of the geodata based on an actual test run, the route data is processed based on information from the digital map in procedural step 102.

To that end, information is gathered from the geodata of route R such as the topological and topographical data, legal speed limits as well as the location of traffic signal systems. Preferably, this information is directly available in the digital map which preferably draws on a database or is itself a database. For example, there is a separate database server for the OpenStreetMaps digital map from which the corresponding information can be retrieved. Preferably, this information is thereby automatically extracted on the basis of the specified route R.

The actual route data extracted from the digital map after the route R has been defined preferably consists of a sequence of map points. Generally speaking, such map points are stored in the digital maps.

This route data is transformed into a coordinate system (in particular X, Y, Z) using the information from the digital map, preferably based on the longitude and latitude of the map points. Furthermore, the route R is preferably interpolated on the basis of the map points taken from the digital map and further map points at a defined distance from each other are established in particular on the basis of said interpolation. Preferably, said generated map point distance is less than that of the map points taken from the map. Preferably, the distance amounts to approximately 2 m. Furthermore, the raw route data taken from the digital map is preferably smoothed with a filter to eliminate discontinuities in the height data.

In order to be able to calculate a maximum cornering speed, the curvature or curve radius respectively is preferably calculated in the curves of route R. So as to be able to determine a realistic course of the route, it is thereby expedient to use map points having different distances for the varying degrees of directional changes for route R interpolation.

Therefore, preferably the angle of the directional change is determined between successive map points for the map points originally taken from the digital map. Should this angle fall short of a threshold value, preferably less than approximately 45°, preferentially less than approximately 40°, and most preferentially less than approximately 30°, the previously formed further map points of a smaller distance are then used for interpolation in the curve. Otherwise, the map points with a larger distance are used for interpolation in the curves.

At traffic signal systems or traffic lights requiring an ensuing stop, a speed of 0 km/h is dictated. Preferably, each traffic signal system is set to a length of 4 m, respectively two increments of distance between three generated map points. Since traffic signal systems are usually not directional in the digital maps, all further traffic signal systems at a defined subsequent distance following a traffic signal in the direction of travel of route R are preferably ignored so that traffic signal systems in the opposite direction will not be misinterpreted as possible stopping points. Such a subsequent distance preferably amounts to approximately 60 m.

Figure 2:
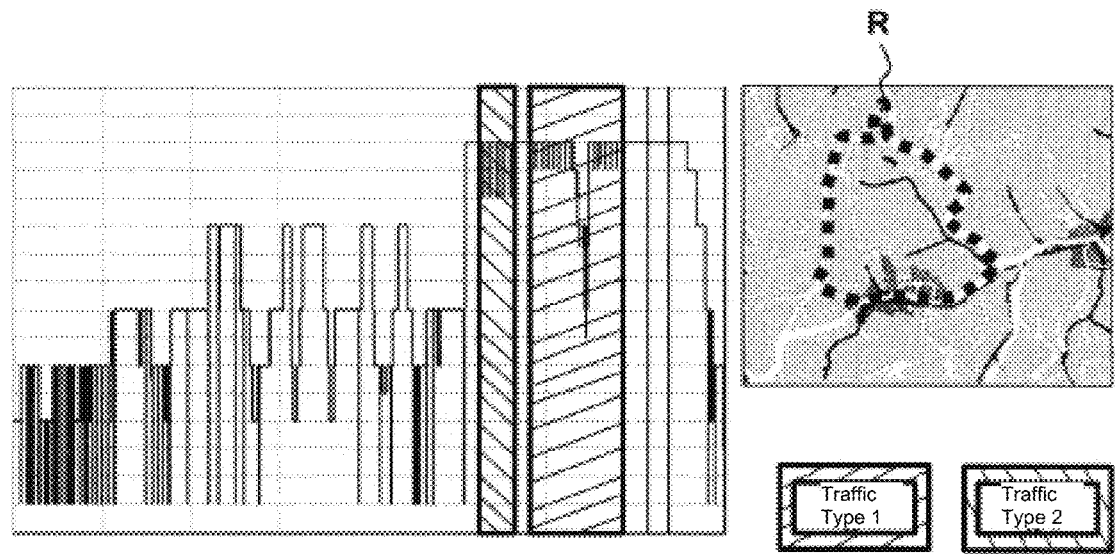
FIG. 2 a static speed profile according to one embodiment of the invention.

Regardless of whether a route R is generated on the basis of a digital map or generated on the basis of a real-world test run, preset speeds can preferably be overwritten by the existing speed limits along the route and, as depicted in FIG. 2, be replaced by speeds stipulated by traffic conditions or traffic factors respectively, particularly in certain sections. For example, one embodiment allows selecting the traffic conditions of unhindered travel, moderate traffic and heavy traffic. Realistic traffic scenarios, e.g. commuter traffic, can in this way be factored into the static speed profile.

There are various approaches to simulating traffic factors. Preferably, a relatively simple model, which leads to reduced speed values in sections of the individual route segments, is used to determine the static speed profile. Preferably, the frequency and amplitude of a traffic factor thereby depends on the speed extracted from the digital map and the traffic volume. The traffic factor frequency decreases with increasing speed and traffic volume whereas its amplitude preferably increases.

The result of processing the route data is a route-based static speed profile of route R resolved into route segments. The individual route segments are thereby preferably assigned a curvature, a slope, a speed value based on legal speed limits and, if applicable, the traffic volume and any traffic signal stopping points. Preferably, the speed values of the route segments can also be limited by a stipulating of cornering speeds.

Such a route-based static speed profile for the course of a route in a digital map is depicted in FIG. 2. As is evident from the speed profile, changes in speed, for example due to a change in the legal speed limit or a required stop at a traffic signal system, are realized by speed jumps. Moreover, two different traffic scenarios are factored into the static speed profile in the hatched areas.

In a next procedural step of the pre-calculation 103, a route-based dynamized speed profile is calculated from the route-based static speed profile. To that end, the route-based speed values of the route segments are limited by further limiting conditions.

Preferably, a maximum cornering speed is first determined in each curve. Preferably, this maximum speed is thereby calculated on the basis of a model for simulating human behavior when cornering.

The following equation is preferably used for this purpose:

$$v = \alpha \cdot k^{1/3}$$

v speed
α driver-dependent parameter
k curvature

This equation only requires the curvature k and the driver-dependent parameter α as input parameters. A lateral dynamics tolerance of a respective type of driver can be changed via parameter α. The α parameter thereby also influences the maximum lateral acceleration (see "On the human control of vehicles: an experimental study of acceleration," Paolo Bosetti, Mauro Da Lio, Andrea Saroldi, Eur. Transp. Res. Rev. (2014) 6:157-170). So doing enables taking into account that people generally accept higher lateral forces at lower speeds than at high speeds.

Figure 3:
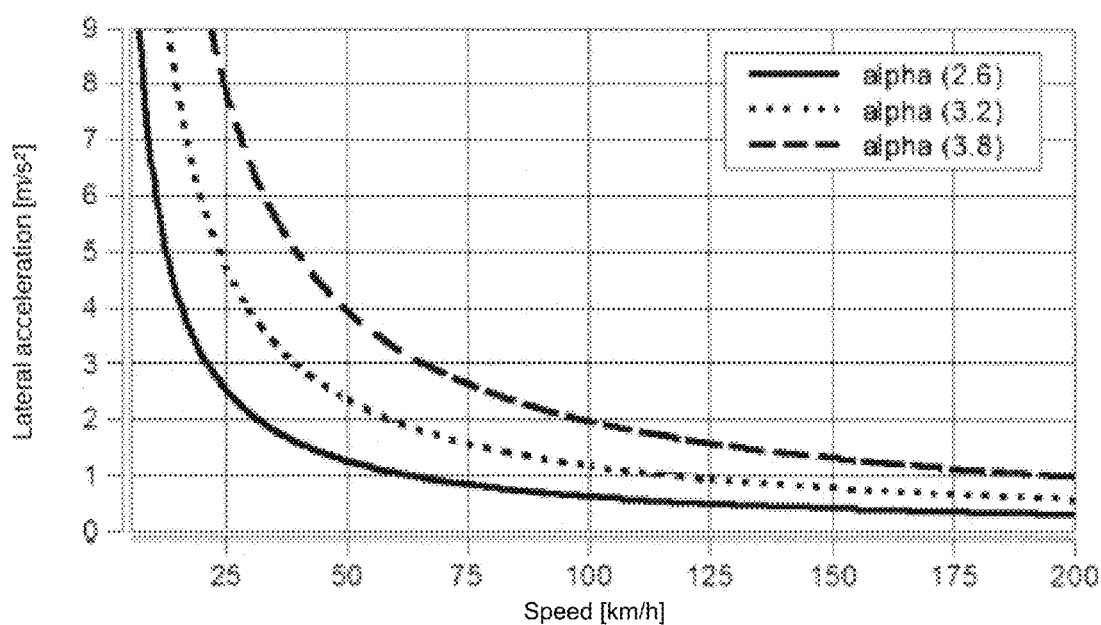
FIG. 3 a diagram of the lateral acceleration tolerance of different driver types.

Corresponding dependencies between tolerable lateral acceleration and speed for a given curve radius r or curvature 1/r respectively and different values of parameter α are depicted in FIG. 3.

Preferably, curves having a radius greater than 600 m are not taken into account because these are perceived as highway-like curves. Furthermore, a minimum cornering speed is preferably specified. Preferably, this amounts to approximately 20 km/h as of a radius r of less than 15 m.

Furthermore, the need for timely braking is preferably factored into the dynamized speed profile. In order to determine suitable braking points at which braking must at the latest occur at a maximum target deceleration, which can be motor vehicle-dependent and/or driver-type-dependent, prior to dips in the static speed profile; i.e. negative speed jumps, the static speed profile is preferably searched backwards in this regard for positive jumps in speed 102a, 102b; 103a, 103b. Upon such a speed jump occurring, the speed value is calculated in each route segment i from the speed minimum of the respective speed jump, or previous route segment i−1, respectively using the following equation:

$$v_i = \sqrt{v_{i-1}^2 + 2 \cdot \Delta s \cdot a}$$

$v_i$ speed in route segment i
$v_{i-1}$ speed in route segment i−1
Δs distance between two route segments, in particular between the midpoints of two route segments
a standard target deceleration, in particular a maximum target deceleration The route-based assignment of speed values to route R which incorporates these speed values forms the route-dependent dynamized speed profile.

In order to replicate the deceleration behavior of actual drivers, additionally to the deceleration curve, a dynamized speed profile is calculated as would arise if the driver simply let the motor vehicle coast upon negative speed jumps in the static speed profile. Preferably thereby used is the deceleration from the sum of driving resistance forces in the engaged state. Alternatively, it is also possible to calculate this in the disengaged state.

Depending on driver type, a combination of coasting and active deceleration will then be applied when the current speed lies between a target speed of the dynamized speed profile and a coasting speed.

If there is no speed jump or respectively change in speed over a longer route section, the speed in the dynamized speed profile is then preferably given a sinusoidal waveform in order to also provide these speed defaults with a certain driving dynamic in the speed profile.

The pre-calculation procedural step 103 is followed in a further procedural step 104 by a simulation based on a driver type and a motor vehicle.

This procedural step 104 preferably factors into a calculation or simulation operational performance, or the performance characteristics of the respective parameterized motor vehicle respectively, in particular by means of a motor vehicle model, as well as the respective parameterized driver type, in particular by means of a driver model.

The speed is thereby preferably not calculated as a function of the distance traveled but rather temporally resolved. From the starting point of the route R, the speed is calculated increment by increment from a model-based acceleration, taking into account a target speed dictated by the dynamized speed profile. There are preferably limiting conditions for the respective acceleration here which additionally limit their value in the respective time increment.

Thus, an acceleration is determined for each time increment with which the motor vehicle is accelerated in the respective time increment. To that end, the respective route segment corresponding to the respective time increment is preferably also determined.

The acceleration desired by the driver model, which is parameterized to a type of driver, initially depends on whether the applied speed in the respective time increment is within or outside of the target speed; i.e. the value of the dynamized speed profile in the route segment i corresponding to the time increment. If the applied speed is outside of the range, acceleration or deceleration occurs depending on whether the target speed is exceeded or undershot and the simulation attempts to reach the target speed within given limiting conditions for the acceleration at a defined acceleration value or a defined standard target deceleration. The defined acceleration value, or the standard target deceleration respectively, is thereby limited by a parameterized maximum target acceleration and preferably also in speed-dependent manner by a limit value for the product of the applied speed and the applied acceleration ($v_i \cdot a$).

As soon as the applied speed reaches the tolerance range or is within the tolerance range, the acceleration in the time increment is selected such that the applied speed asymptotically approaches the target value of the dynamized speed profile in the route segment i corresponding to the time increment.

Preferably, the following equations are used for calculating the equalizing acceleration:

$$a_{angleich} = \frac{(V_{ziel} - V(t))}{(V_{ziel} - V_{Tol\ down})} \cdot a(t)$$

or $$a_{angleich} = \frac{(V_{ziel} - V(t))}{(V_{ziel} - V_{Tol\ up})} \cdot a(t)$$

where:
$a_{angleich}$ equalizing acceleration in the tolerance range
$V_{ziel}$ target speed
$v(t)$ applied speed
$v_{Tol\ down}$ lowest speed value of the tolerance range
$v_{Tol\ up}$ highest speed value of the tolerance range
$a(t)$ defined target deceleration or standard target acceleration In addition to the driver, however, the motor vehicle can also come under consideration as a limiting acceleration constraint. Preferably, the load on the engine is therefore calculated in each time increment in order to limit the acceleration of the motor vehicle if need be due to the engine performance; i.e. the engine characteristics.

Preferably, the driver model furthermore considers that some types of drivers reduce acceleration on slopes. Therefore, the grade resistance in the respective route segment corresponding to the time increment is initially calculated and the resulting downhill acceleration deducted from the standard target acceleration dictated by the driver model. Preferably, however, this is only applied at speeds outside of the tolerance range.

Additionally, a so-called projection can be implemented in the respective driver model for all driver types. Different projected times are thereby specified depending on driver type. Such a projected time, together with the speed applied in the respective time increment, yields a range of route segments up to which the respective driver model projects ahead.

From that, preferably double the area in the distance is on the one hand checked as to whether the applied speed in the current time increment is higher than the specified target speeds of the dynamized speed profile in the doubled area. If so, the acceleration is initially set to "zero" for the further time increments.

Further checked on the other hand is whether a coasting speed curve, based on the applied speed in the current time increment, would intersect the dynamized speed profile which, in this area, represents a braking curve. If so, coasting is started; i.e. a coasting speed curve based on the applied speed is used.

Only upon the intersecting of this coasting speed curve with the dynamic speed profile; i.e. the intersecting of the actual braking curve, does the transition to applying the defined target deceleration occur in order to then follow the dynamized speed profile until reaching the speed minimum induced by the braking maneuver.

This type of projection is intended to replicate the behavior of many drivers of not initially further increasing speed prior to foreseeable braking maneuvers, thereupon decelerating without active braking for a certain time in overrun mode or alternatively also when coasting; i.e. engaged or disengaged, and only later starting active braking.

Figure 4:
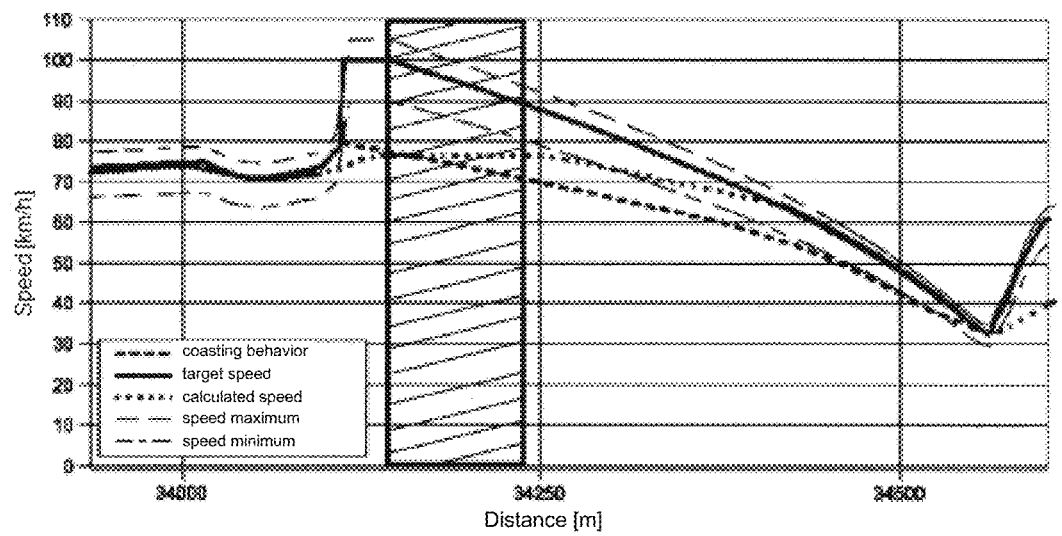
FIG. 4 a section of a dynamic speed profile in the region of a deceleration.

FIG. 4 depicts such behavior upon deceleration allowing for a projection.

A total of five graphs are thereby plotted in FIG. 4. In the marked distance range, these are from bottom to top:

The lowermost graph relates to the progression when the speed minimum is to be reached solely by coasting in neutral alone.

The second lowest graph relates to the progression of a time-based dynamic speed profile according to the invention.

The third lowest graph relates to the lower region of the tolerance range around the route-based static speed profile which dictates the target speed.

The fourth lowest graph relates to the inventive route-based static speed profile.

The uppermost graph relates to the upper edge of the tolerance range around the route-based static speed profile which dictates the target speed.

The time-based dynamic speed profile initially increases from a minimum in the section ahead of the marked area. This acceleration range is determined by a defined acceleration value, in particular less than or equal to a maximum target acceleration. For this reason, the speed here cannot follow the route-based dynamized speed profile, the increase of which at this point is caused by a change in the statutory speed limit.

The projection function of the inventive method starts at the beginning of the marked area. It is initially assumed here that a driver, as clarified above, would first transition from acceleration to a state of constant speed.

Furthermore assumed is that the driver would allow the vehicle to coast for a certain time thereafter, which explains the parallel course of the time-based dynamic speed profile after the marked area. The time-based dynamic speed profile in this area runs approximately parallel to the bottom graph, the coasting graph.

Lastly, once the time-based dynamic speed profile reaches the route-based dynamized speed profile or the target speed respectively, it is then assumed that the driver, as when calculating the route-based dynamized speed profile, brakes at the defined standard target deceleration, in particular a maximum target deceleration, until he has reduced the vehicle to the speed of the in particular mandatory speed minimum in the right section of the diagram.

Active braking with implemented projection according to the inventive method is thus not effected until approximately the last third of a required reduction in speed.

Preferably, the acceleration in the route-based dynamized speed profile is also limited by a limitation on acceleration depending on the respective type of driver. This ensures that a change in acceleration per unit time, in particular per second, does not exceed a predetermined limit. The route-based dynamic speed profile is thus smoothed and preferably has limited jerks. This is crucial for the applicability of the generated cycles or their realism respectively.

Preferably, the vehicle model underlying the time-based dynamic speed profile is defined as point mass. In addition to acceleration resistances and grade resistances, this imparts forces on the coasting curve resistance in the engaged or disengaged state.

Preferably, a shifting logic is implemented in the vehicle model (in the case of an automatic) or the driver model (in the case of a manual transmission) underlying the time-based dynamic speed profile.

Further preferably, such a shifting logic is contingent upon predetermined minimum engine speeds and maximum engine speeds and the available engine torque in the current operation. Should these limits be exceeded, shifting occurs into the next higher or next lower gear as is present.

Preferably, the engine speed in the next higher and next lower gear is also calculated in parallel. If no acceleration is anticipated in the ensuing five seconds and the engine speed in the next higher gear is higher than the minimum engine speed for shifting in constant-speed mode, upshifting ensues. If there is acceleration at the same time and the engine speed in the next lower gear is lower than the maximum engine speed for shifting in acceleration, the next lower gear is selected.

In addition, shifting to the lower gear preferably occurs upon insufficient torque reserve, even when there is no acceleration.

Preferably, when simulating automatic transmissions, the shifting logic of the respective transmission can also be adopted into the vehicle model in order to calculate the time-based dynamic speed profile.

In the case of manual transmissions, a shift delay during shifting can preferably be further provided, in particular of approximately one second.

In phases without traffic and route curvature, a simplified regulating behavior can furthermore be superimposed on the time-based dynamic speed profile. In so doing, the speed over such a route area or increment of time respectively is not constant the entire time, which better reflects the conditions during actual driving. Preferably, at a constant speed specification, the target speed is thereby superimposed using a sine function, whereby the amplitude and the frequency are further preferably contingent on the speed specification of the time-based dynamic speed profile. At lower speeds, the amplitude is low and the frequency is high and vice versa.

Preferably, the dynamic speed profile is output in a further procedural step 105, preferably at a data interface and/or user interface.

In order to additionally gauge an estimate of the relevance of a route R in terms of the RDE legislation, a $CO_2$ characteristic can be stored for the respective considered vehicle. This so-called V-line is thereby preferably generated from the measurement data of a WLTC (Worldwide Harmonized Light Vehicles Test Cycle). The $CO_2$ emissions for a preset output can be determined from same. This allows, as in a real-world test drive, applying PEMS data post-processing and thus the checking of a simulated test drive for RDE compliance.

Parameters of the vehicle model are preferably the total vehicle mass, parameters for the coasting resistance, the full load curve of the motor vehicle, the gear ratio, the differential ratio, the tire size and/or the V-line. Driver parameters of the driver model are preferably the maximum target acceleration, a standard target deceleration, a maximum jerk; i.e. a maximum acceleration change per unit time, a driver-specific maximum speed and a value for parameter $\alpha$, which characterizes the permissible cornering speed. These parameters are generally easy to research such that it is particularly simple to parameterize an inventive dynamic speed profile. Preferably, no detailed model parameters are necessary. Particularly preferentially, only parameters able to be found on the internet are needed.

Preferably, the driver model which is the basis of the time-based dynamic speed profile comprises three types of drivers, driver type A, B and C, providing different limiting conditions by means of different parameterizations, particularly in terms of the driving dynamics. Other driver types are also possible.

Figure 5:
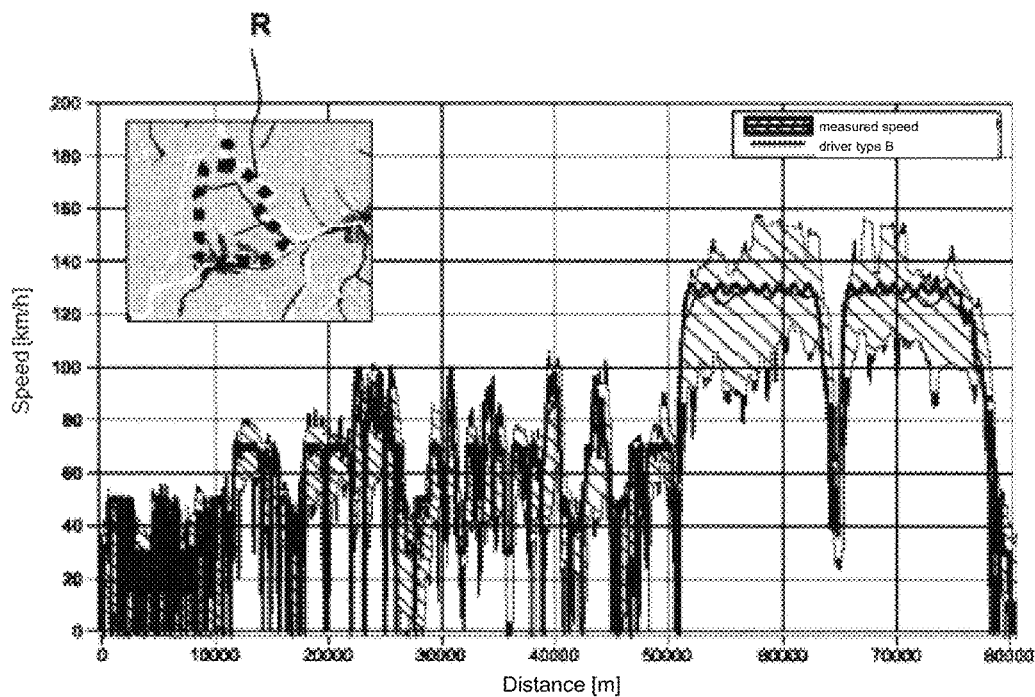
FIG. 5 a dynamic speed profile compared to a measured speed profile.

FIG. 5 depicts a time-based dynamic speed profile determined by means of the inventive method, see the solid line, for a defined route R on a digital map, see top left of FIG. 5. For comparison, the speed range around the time-based dynamic speed profile depicts the range of the speed from several real-world test drives on the actual route R.

For the most part, the time-based dynamic speed profile generated by the inventive method lies within the distribution range generated by test runs. In addition, the absolute values of the calculated dynamic speed profile with driver type B are within similar ranges to the average speed of the real-world test runs.

As clarified above, the sinusoidal oscillations of the dynamic speed profile in the range of highway speed have been deliberately superimposed in order to realize a certain driving dynamic despite uniformly constant speed specifications on the route-based dynamized speed profile and moreover easily simulate a regulating behavior of persons when adjusting constant speeds.

Figure 6:
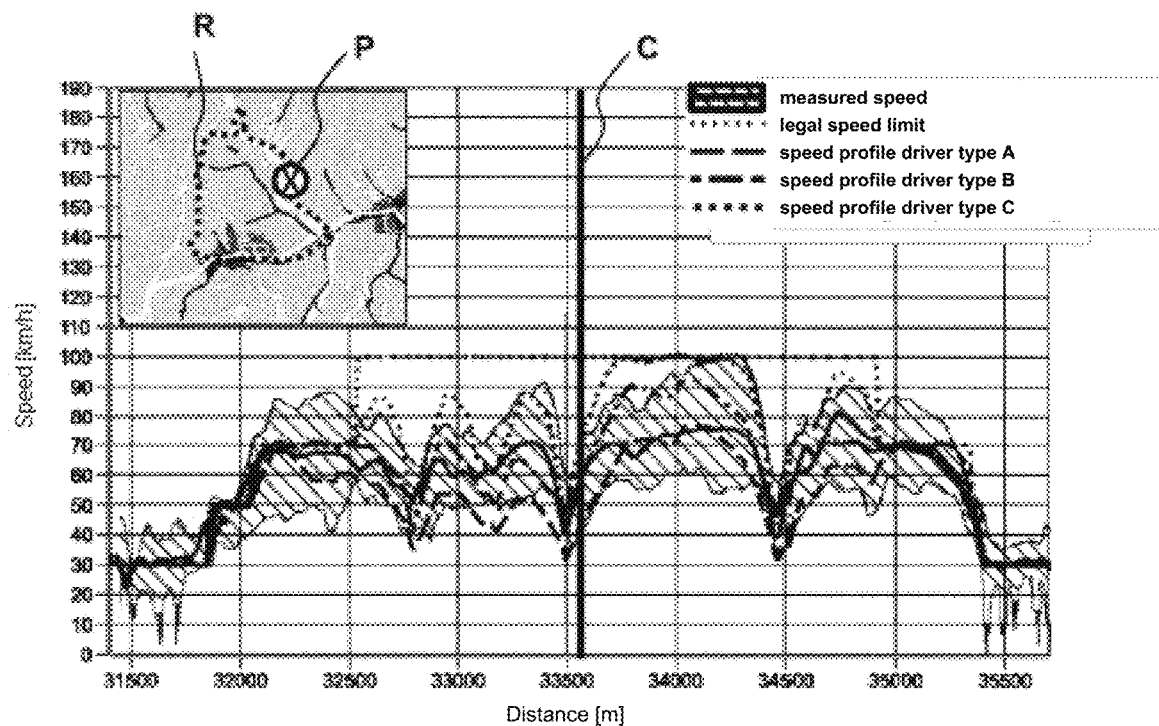
FIG. 6 dynamic speed profiles for different driver types compared to measured speed profiles.

FIG. 6 represents an enlarged section of the speed profile from FIG. 5. At the distance of 33,000 m, the individual graphs represent the following from bottom to top:

The lowermost graph relates to a time-based dynamic speed profile for a driver type A.
The second lowest graph relates to a mean measured speed for a plurality of real-world test runs; their distribution range around this mean speed is marked.
The third lowest graph relates to a time-based dynamic speed profile for a driver type B.

The fourth lowest graph relates to a time-based dynamic speed profile for a driver type C.

The uppermost graph relates to the legal speed limit in the depicted route section.

It is clear from the diagram that the cornering speed calculated for the different driver types by means of the inventive method is of a considerably lower speed than the legal speed limit. With the A, B and C values, the driver type parameter covers the cornering speed range of actual drivers in these ranges. The position of a cursor C (vertical line in the diagram) in conjunction with a circle P on the digital map thereby shows where the motor vehicle currently is on the route R.

Deviations in the time-based dynamic speed profiles of the individual driver types from the test runs are in particular attributed to the method underlying FIG. 6 not factoring in any disruptions due to traffic.

In terms of acceleration and deceleration behavior, the higher dynamics of driver type C can be seen and also that driver type A is the earliest to start the described coasting behavior when it becomes clear that a deceleration to a speed minimum will be necessary within his projection period or range respectively.

Figure 7:
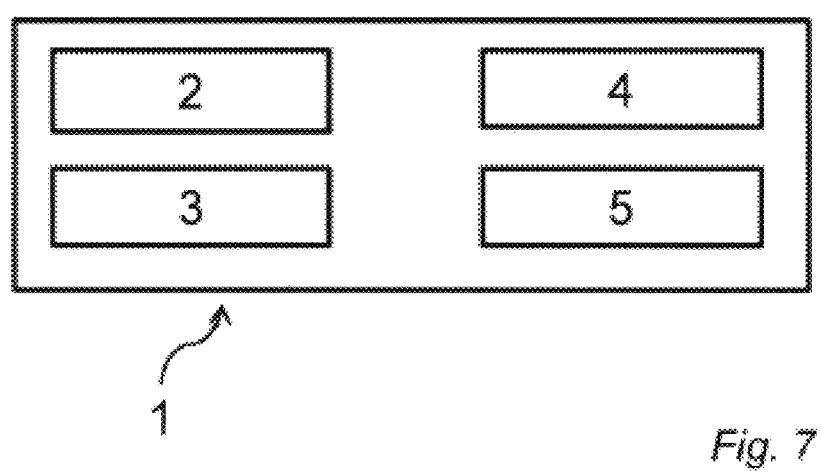
FIG. 7 an exemplary embodiment of an inventive apparatus for generating a dynamic speed profile.

An apparatus for generating a dynamic speed profile 1 shown in FIG. 7 preferably comprises means 2 for determining a route-based static speed profile for the route R on the basis of information from a digital map, means 3 for determining, based on the route-based static speed profile, a route-based dynamized speed profile which incorporates a defined maximum target deceleration to reach in particular mandatory speed minima of the route-based static speed profile, means 4 for determining a time-based dynamic speed profile, based on the route-based dynamized speed profile, whereby an applied acceleration in each time increment is determined on the basis of the speed dictated by the speed profile in a route segment corresponding to the respective time increment and the speed specified in the time increment, and an interface 5 for outputting the time-based dynamic speed profile. The individual means 2 to 5 are thereby preferably connected by a data connection. Furthermore, the apparatus 1 preferably comprises a further interface for importing information from a digital map and/or importing the route R. The interfaces are thereby preferably data interfaces and/or user interfaces.

In another exemplary embodiment, the dynamic speed profile serves to guide a motor vehicle via a driver assistance system, in particular for predictive driving functions.

In this case, target speeds for guiding the motor vehicle on a specific route R are determined on the basis of the dynamic speed profile.

The route R is thereby preferably determined as a so-called MostProbablePath 101b. This indicates the route which the driver assistance system, in particular an adaptive cruise control (ACC), will most likely select when guiding the vehicle. This determined or respectively calculated path is rendered as a quasi-known route for the basis of determining the dynamic speed profile.

Accordingly, the method also determines a route-based dynamic speed profile resolved into route segments for the route R. This route-based dynamic speed profile specifies a target speed for each route segment. Preferably, this target speed then serves as the initial speed for a cruise control of the driver assistance system.

The above-described exemplary embodiments are merely examples which are in no way to limit the scope of protection, application or configuration of the method and apparatus according to the invention. Rather, the preceding description affords one skilled in the art a guideline for the implementation of at least one exemplary embodiment, whereby various modifications can be made, in particular with regard to the function and arrangement of the described components, without departing from the protective scope as results from the claims and equivalent combinations of features.

What is claimed is:

1. A method for generating a dynamic speed profile of a motor vehicle for simulating vehicle operation on a test bench and/or on a test computer in a model-based manner, the method comprising:

determining a route-based static speed profile for a route resolved into route segments based on information from a digital map, wherein speeds of the route-based static speed profile correspond to respective maximum speed values granted by a driver or by a legal speed limit;

determining a route-based dynamized speed profile on the basis of the route-based static speed profile, wherein the route-based dynamized speed profile factors in a defined target deceleration to reach speed minima of the route-based static speed profile;

determining the dynamic speed profile, resolved into time increments, on the basis of the route-based dynamized speed profile, wherein a speed of the dynamic speed profile is calculated time increment by time increment from a starting point of the route from an applied acceleration determined in each preceding time increment, wherein the applied acceleration is determined based on a speed dictated by the route-based dynamized speed profile in a route segment corresponding to the respective preceding time increment and an applied speed in the respective preceding time increment; and controlling the speed of the motor vehicle during the simulated vehicle operation on the test bench and/or on the test computer in the model-based manner based on the dynamic speed profile, wherein the amount of an acceleration value difference in one time increment of the time increments to an acceleration value in a preceding time increment of the time increments is less than a threshold value, wherein the threshold value is determined as a function of the driving physics, the motor vehicle, and/or a driver.

2. The method according to claim 1, wherein after one traffic signal, further traffic signals in a defined area are not taken into account when determining the route-based static speed profile.

3. The method according to claim 1, wherein a maximum speed for the route-based static speed profile is driver-specific.

4. The method according to claim 1, wherein upon the occurrence of speed jumps in the route-based static speed profile, ensuing from a speed minimum, applied speeds in the preceding route segments are determined for the route-based dynamized speed profile based on a respective speed applied in a following segment and a defined standard target deceleration until an applied speed in one route segment of the preceding route segments reaches the value of the route-based static speed profile in said route segment.

5. The method according to claim 4, wherein the standard target deceleration lies between a maximum target deceleration and a coasting deceleration defined by a coasting behavior of the motor vehicle.

6. The method according to claim 1, further comprising:

determining a coasting speed profile which factors in a target deceleration defined by a coasting behavior of the motor vehicle in order to reach the speed minima of the route-based static speed profile.

7. The method according to claim 1, wherein upon the occurrence of speed jumps in the route-based static speed profile, ensuing from a speed minimum, applied speeds in the preceding route segments are determined for the route-based dynamized speed profile based on a respective speed applied in a following route segment and the target deceleration defined by a coasting behavior of the motor vehicle until a speed applied in one route segment of the preceding route segments reaches the value of the route-based static speed profile in said route segment.

8. The method according to claim 4, wherein a progression of the route-based dynamized speed profile is determined on a driver-specific basis between a progression determined by means of the standard target deceleration and a progression determined by means of a coasting behavior of the motor vehicle.

9. The method according to claim 1, wherein the acceleration for the dynamic speed profile in one time increment of the time increments is set to a defined acceleration value or a defined deceleration value when an applied speed is lower or higher than the value of the route-based dynamized speed profile at the route segment corresponding to said time increment.

10. The method according to claim 9, wherein the defined acceleration value depends on performance characteristics of the motor vehicle.

11. The method according to claim 9, wherein the defined acceleration value is reduced to an equalizing acceleration dependent on the applied speed in the respective time increment within a tolerance range around the route-based dynamized speed profile.

12. The method according to claim 1, wherein a maximum target acceleration is driver-specific.

13. The method according to claim 1, wherein a shifting logic of the motor vehicle is taken into account for the dynamic speed profile, wherein the shifting logic provides for an upshifting upon the engine reaching a maximum rotational speed and a downshifting at a minimum engine rotational speed, and wherein with a manual transmission vehicle a defined shift delay is further factored in.

14. The method according to claim 13, wherein the dynamic speed profile is determined on the basis of a target deceleration defined by a coasting behavior of the motor vehicle during the shift delay.

15. The method according to claim 1, further comprising:
checking whether there is a jump in speed in the route-based static speed profile or the route-based dynamized speed profile in a first upcoming route section representing a first predefined time period in relation to a first respective time increment of the time increments,
wherein upon a speed jump being ascertained, a target deceleration defined by a coasting behavior of the motor vehicle is selected as a defined deceleration value, and
wherein upon an applied speed in a time increment and/or a corresponding route segment reaching a value of the route-based static speed profile or the route-based dynamized speed profile, a defined standard target deceleration is selected as the defined deceleration value.

16. The method according to claim 15, further comprising:
checking whether there is a speed jump in the route-based static speed profile and/or the route-based dynamized speed profile in a second upcoming route section representing a second predefined period of time in relation to a second respective time increment of the time increments,
wherein upon a jump in speed being determined, "zero" is selected as the defined deceleration value, and
wherein the second predefined time period is prior to the first predefined time period.

17. The method according to claim 1, wherein each curve of the route is assigned a maximum cornering speed for the route-based static speed profile or the route-based dynamized speed profile on the basis of the following parameters:
a respective curve radius;
a respective curvature;
a driver-specific parameter; and
a maximum lateral acceleration.

18. The method according to claim 1, wherein map points are read in from the digital map for the route-based static speed profile and/or generated on the basis of the information from the digital map.

19. The method according to claim 18, wherein a distance between the map points is established to determine a curve radius of the route-based static speed profile as a function of an angle between a straight line through a first and a second map point read from the digital map and another straight line through the second and a third map point read from the digital map, wherein generated map points with a smaller distance and map points with a larger distance are selected for larger angles.

20. The method according to claim 19, further comprising:
linking the selected map points to a trajectory of the motor vehicle for simulation.

21. The method according to claim 1, wherein the dynamic speed profile is output as a time-based dynamic speed profile.

22. The method according to claim 1, wherein an output route-based dynamic speed profile resolved into route segments is determined on the basis of the dynamic speed profile resolved into time increments.

23. The method according to claim 1, wherein the method is used for analyzing at least one component of the motor vehicle,
wherein the at least one component of the motor vehicle is subjected to a real or simulated test operation on the basis of the dynamic speed profile.

24. The method according to claim 1, wherein the method is used for guiding the motor vehicle by means of a driver assistance system,
wherein target speeds for guiding the motor vehicle by means of the driver assistance system are determined in the dynamic speed profile.

25. The method according to claim 23, wherein the route-based dynamized speed profile is determined on the basis of the route-based static speed profile, wherein the defined target deceleration is factored in to reach the speed minima of the route-based static speed profile.

26. The method according to claim 23, wherein the dynamic speed profile and/or the route-based dynamized speed profile and/or the route-based static speed profile depend(s) on one or more parameters.

27. The method according to claim 26, wherein the one or more parameters are varied in order to analyze the at least one component of the motor vehicle.

28. A computer program containing commands for realizing the steps of the method according to claim 1, wherein the computer program is stored on a non-transitory computer readable medium, and wherein the computer program is capable of being executed by a computer.

29. An apparatus for generating a dynamic speed profile of a motor vehicle which is suitable for simulating vehicle operation on a on a test computer in a model-based manner, comprising:

a processor, the processor configured for:
determining a route-based static speed profile for a route resolved into route segments based on information from a digital map, wherein the route-based static speed profile is raw data determined in the digital map on the basis of the route, and wherein the route is previously traveled by a motor vehicle or is established by a user using the digital map;
determining a route-based dynamized speed profile on the basis of the route-based static speed profile, wherein the route-based dynamized speed profile factors in a defined maximum target deceleration to reach speed minima of the route-based static speed profile to achieve a steady progression of a speed in the route-based dynamized speed profile based on the raw data of the route-based static speed profile;
determining the dynamic speed profile, resolved into time increments, on the basis of the route-based dynamized speed profile, wherein a speed of the dynamic speed profile is calculated time increment by time increment from a starting point of the route from an applied acceleration determined in each preceding time increment, wherein the applied acceleration is determined based on a speed dictated by the route-based dynamized speed profile in a route segment corresponding to the respective preceding time increment and an applied speed in the respective preceding time increment; and
controlling the speed of the motor vehicle during the simulated vehicle operation on the test computer in the model-based manner based on the dynamic speed profile,
wherein the amount of an acceleration value difference in one time increment of the time increments to an acceleration value in a preceding time increment of the time increments is less than a threshold value, wherein the threshold value is determined as a function of the driving physics, the motor vehicle, and/or a driver.

30. A method for generating a dynamic speed profile of a motor vehicle which is suitable for simulating vehicle operation on a test bench, comprising:

determining a route-based static speed profile for a route resolved into route segments based on information from a digital map;
determining a route-based dynamized speed profile on the basis of the route-based static speed profile, wherein the route-based dynamized speed profile factors in a defined target deceleration to reach speed minima of the route-based static speed profile;
determining the dynamic speed profile, resolved into time increments, on the basis of the route-based dynamized speed profile, wherein a speed of the dynamic speed profile is calculated time increment by time increment from a starting point of the route from an applied acceleration is determined in each preceding time increment, wherein the applied acceleration is determined based on a speed dictated by the route-based dynamized speed profile in a route segment corresponding to the respective preceding time increment and an applied speed in the respective preceding time increment; and
running the dynamic speed profile on the test bench,
wherein each curve of the route is assigned a maximum cornering speed for the route-based static speed profile or the route-based dynamized speed profile on the basis of the following parameters:
a respective curve radius;
a respective curvature;
a driver-specific parameter; and
a maximum lateral acceleration.

* * * * *